US009068602B2

(12) United States Patent
Hoe et al.

(10) Patent No.: US 9,068,602 B2
(45) Date of Patent: Jun. 30, 2015

(54) LOCKING MECHANISM FOR THE SUPPORT ARM ELBOW OF A SELECTIVELY ADJUSTABLE MULTIPURPOSE SUPPORT STAND

(71) Applicants: Low Boon Hoe, Johor (MY); Low How Wei, Johor (MY)

(72) Inventors: Low Boon Hoe, Johor (MY); Low How Wei, Johor (MY)

(*) Notice: Subject to any disclaimer, the term of this patent is extended or adjusted under 35 U.S.C. 154(b) by 225 days.

(21) Appl. No.: 13/655,199

(22) Filed: Oct. 18, 2012

(65) Prior Publication Data

US 2014/0110541 A1    Apr. 24, 2014

(30) Foreign Application Priority Data

Nov. 10, 2011    (MY) .......................... PI 2011005419

(51) Int. Cl.
| | |
|---|---|
| *F16C 11/10* | (2006.01) |
| *F16D 1/12* | (2006.01) |
| *A47B 3/08* | (2006.01) |
| *F16M 11/02* | (2006.01) |
| *F16M 11/14* | (2006.01) |
| *F16M 11/18* | (2006.01) |
| *F16M 11/20* | (2006.01) |
| *F16M 11/26* | (2006.01) |

(52) U.S. Cl.
CPC ........... *F16D 1/12* (2013.01); *Y10T 403/32426* (2015.01); *F16C 11/10* (2013.01); *A47B 3/0818* (2013.01); *F16M 11/02* (2013.01); *F16M 11/14* (2013.01); *F16M 11/18* (2013.01); *F16M 11/2021* (2013.01); *F16M 11/26* (2013.01); *F16M 2200/024* (2013.01); *F16M 2200/08* (2013.01)

(58) Field of Classification Search
CPC ........ F16C 11/10; F16M 11/02; F16M 11/18; A47B 3/0818
USPC ............ 248/183.2, 292.12, 292.13, 408, 425; 403/78, 83, 84, 87, 104
See application file for complete search history.

(56) References Cited

U.S. PATENT DOCUMENTS

| | | | | | |
|---|---|---|---|---|---|
| 1,940,169 | A | * | 12/1933 | Hinton ........................... | 172/372 |
| 2,649,087 | A | * | 8/1953 | Allyn et al. .................... | 600/193 |
| 3,713,619 | A | * | 1/1973 | Marty ............................ | 248/425 |
| 4,248,161 | A | * | 2/1981 | Adair et al. ....................... | 108/6 |
| 4,832,299 | A | * | 5/1989 | Gorton et al. ............. | 248/231.71 |
| 4,959,671 | A | * | 9/1990 | Ishikawa ....................... | 396/428 |
| 5,056,805 | A | * | 10/1991 | Wang .......................... | 280/47.36 |
| 5,263,507 | A | * | 11/1993 | Chuang ......................... | 135/140 |
| 5,415,254 | A | * | 5/1995 | Ishikawa ....................... | 188/294 |

(Continued)

*Primary Examiner* — Terrell McKinnon
*Assistant Examiner* — Eret McNichols
(74) *Attorney, Agent, or Firm* — Edwin D. Schindler

(57) ABSTRACT

A locking mechanism for the elbow swivel joint of a support arm for selectively locking the lower arm section and upper arm section of the support arm relative to each other, in which the lower arm section has a swivel head positioned between the end flanges of the upper arm section. A carriage bolt runs through centrally-located coplanar screw holes in the swivel head and end flanges for completing the live hinge of the swivel joint elbow. The locking mechanism preferably includes three spring-biased locking pins that sit in three open-ended guide channels in the relevant end flange of the upper arm section, and there are also a plurality of corresponding locking pin receiving notches on the engagement surface of the swivel head, and a locking knob for compelling the three spring biased locking pins into mating engagement with the corresponding locking pin receiving notches on the engagement surface of the swivel head and holding them in place.

7 Claims, 12 Drawing Sheets

(56) References Cited

U.S. PATENT DOCUMENTS

| | | | |
|---|---|---|---|
| 5,689,999 A * | 11/1997 | Wiley et al. | 74/527 |
| 5,761,844 A * | 6/1998 | Horschel | 43/21.2 |
| 5,816,545 A * | 10/1998 | Malizia | 248/164 |
| 6,196,568 B1 * | 3/2001 | Stevens | 280/304.1 |
| 6,209,835 B1 * | 4/2001 | Walrath et al. | 248/276.1 |
| 6,220,556 B1 * | 4/2001 | Sohrt et al. | 248/279.1 |
| 6,343,406 B1 * | 2/2002 | Yeh | 16/328 |
| 6,688,797 B2 * | 2/2004 | Park et al. | 403/93 |
| 6,694,891 B1 * | 2/2004 | Lai | 108/6 |
| 6,923,416 B1 * | 8/2005 | Hsieh | 248/431 |
| 7,040,831 B2 * | 5/2006 | Rapaport | 403/84 |
| 7,055,791 B2 * | 6/2006 | Lawrence | 248/578 |
| 7,303,171 B1 * | 12/2007 | Chen et al. | 248/184.1 |
| 7,368,647 B2 * | 5/2008 | Hsieh | 84/327 |
| 7,419,127 B2 * | 9/2008 | Buehler | 248/292.12 |
| 7,523,904 B2 * | 4/2009 | Carnevali | 248/278.1 |
| 7,631,575 B2 * | 12/2009 | Gard et al. | 74/530 |
| 7,641,162 B2 * | 1/2010 | Tsay | 248/284.1 |
| 7,938,570 B2 * | 5/2011 | Lee et al. | 362/652 |
| 7,959,120 B2 * | 6/2011 | Liao | 248/278.1 |
| 8,196,884 B2 * | 6/2012 | Chiang | 248/286.1 |
| 8,317,152 B1 * | 11/2012 | Zhou | 248/596 |
| 8,413,593 B2 * | 4/2013 | Korb | 108/6 |
| 8,511,207 B2 * | 8/2013 | Su | 81/177.7 |
| 8,567,739 B2 * | 10/2013 | Zhou | 248/397 |
| 8,801,320 B2 * | 8/2014 | Ng | 403/111 |
| 2003/0156891 A1 * | 8/2003 | Hung et al. | 403/84 |
| 2004/0247377 A1 * | 12/2004 | Consolini et al. | 403/83 |
| 2005/0121578 A1 * | 6/2005 | Asamarai et al. | 248/284.1 |
| 2007/0164176 A1 * | 7/2007 | Liao | 248/176.3 |
| 2008/0282640 A1 * | 11/2008 | Mathews et al. | 52/711 |
| 2009/0207589 A1 * | 8/2009 | Smith | 362/98 |
| 2009/0224122 A1 * | 9/2009 | Liao | 248/292.13 |
| 2012/0211633 A1 * | 8/2012 | Zhou | 248/397 |
| 2012/0312937 A1 * | 12/2012 | Weber et al. | 248/125.2 |
| 2013/0205558 A1 * | 8/2013 | Sporer et al. | 29/407.01 |
| 2014/0057742 A1 * | 2/2014 | Schell | 473/429 |
| 2014/0105670 A1 * | 4/2014 | Plomteux et al. | 403/83 |

* cited by examiner

LOCKING MECHANISM FOR THE SUPPORT ARM ELBOW OF A SELECTIVELY ADJUSTABLE MULTIPURPOSE SUPPORT STAND

TECHNICAL FIELD OF THE INVENTION

The present invention relates to a locking mechanism and more particularly to a locking mechanism for an elbow joint that is robust and strong.

DESCRIPTION OF THE PRIOR ART

Various support stands are known in the industry, and are normally used and designed to hold devices and items such as tablet computers, laptop computers, electronic organizers, ebooks, books, presentation material, and other suitable items. These stands make it very convenient for the user. For example, a person sleeping on a bed or sitting in a chair can read their book or use their tablet computer by simply fixing their item onto the support stand, and adjust the stand to the desired height and position.

Examples of such support stands 1 and 2 are those sold under the brand names IPROP™ and LEVOBOOK™ as shown in prior art drawing FIGS. 1 and 2 respectively. Each of the support stands 1 and 2 has a stand base 1B and 2B respectively, an adjustable body portion in the form of a pole 1P and 2P respectively, and display holders 1D and 2D respectively for holding devices such as tablet computers.

While these prior art designs are suitable for ordinary use, there are some serious limitations. For example, and referring to FIG. 1, the IPROP™ support stand 1 has a wire mechanism for its pole IP. To adjust the stand, the pole 1P has to be bent and turned to the proper position directly with the hand. This is not a very steady construction and over time the shape and strength of the pole 1P may be affected. Also, importantly, due to the flimsiness of the pole, it is near impossible to type on the, for example, tablet computer, being held by the stand 1 as the tablet computer will be pushed by the user's fingers due to the poor strength of the wire mechanism of the pole 1P. Also, since there is generally no limiting mechanism to prevent the display holder 1D of the stand 1 from being displaced too far forward, it is possible that the whole stand may fall over when a heavy item or device is being held and the display holder 1D is pushed too far until the center of gravity of the whole stand moves beyond the stand base 1B.

Referring to FIG. 2, the LEVOBOOK™ support stand 2, while sturdier than the IPROP™ support stand 1, has some inherent deficiencies too. The height adjustment mechanism of the LEVOBOOK™ stand 2 is a set of telescoping tubes. To adjust the height of the display holder, locking nut 2N is turned to the unlock position, the height of the pole 2P is adjusted, and the locking nut 2N is turned to the lock position. The problem with this type of locking mechanism is that there is no failsafe anti-fall mechanism. If the locking nut is not set properly, the upper part of the pole 2P may suddenly fall downward. This may result in damage to the device, such as a tablet computer, being held by the display holder 2D. In a worse case, the falling of the pole may lead to injury to the user. Also, over time, the effectiveness of the locking nut 2N locking mechanism may become compromised due to wear and tear.

There is therefore a need in the industry for a reliable and failsafe locking mechanism, especially for support stands. Such a locking mechanism should be sturdy, stable and long lasting. It should allow a device, such as a tablet computer, to be firmly attached and allow the user to type on the device.

It is also important for the support stand that utilizes such a locking mechanism to be robust and have a stable base to prevent the stand from tilting over and falling.

SUMMARY OF THE INVENTION

It is an objective of the present invention to provide a locking mechanism for an elbow joint structure whereby the locking mechanism is reliable, sturdy and easy to use.

It is another objective if the present invention that the locking mechanism allows the lower arm and upper arm sections of a support arm with the elbow joint to be selectively secured in the desired position relative to each other.

It is yet another objective of the present invention to provide an elbow swivel joint that has a locking mechanism that is failsafe, stable and long lasting.

It is still yet another objective of the present invention to provide a multipurpose support stand for steadily holding tablet computers, laptop computers, books, etc. that utilizes the locking mechanism of the present invention.

It is still yet another objective of the present invention to provide such a multipurpose support stand that has a stand base that is stable and firm.

The aforementioned objectives are readily met by the present invention, whereby according to one aspect of the invention there is provided a locking mechanism for the elbow swivel joint of a support arm so that the lower and upper arm sections of the support arm can be locked in place at the desired angle. The swivel joint is made up of the end portions of the lower and upper arm sections, whereby the lower arm section has an end with a swivel head that is adapted to be placed between the corresponding end flanges of an end of the upper arm section. The swivel head of the lower arm section and the end flanges of the upper arm section have centrally-located coplanar screw holes. The elbow swivel joint is completed by a common hinge member that runs through the coplanar screw holes. The lower arm section swivels about this common hinge member relative to the upper arm section. The hinge member is expediently a carriage bolt that has a smooth cylindrical body section for the pivoting action and male screw threads at its distal end that extends out of the exit end of the end flanges of the upper arm section.

The locking mechanism of the afore-described elbow swivel joint comprises three essential parts as follows:

a) At least one spring-biased locking pin which is disposed in at least one corresponding open-ended guide channel in at least one of the two corresponding end flanges of the upper arm section;

b) A plurality of corresponding locking pin receiving notches on the engagement surface of the swivel head end portion of the lower arm section that abuts the end flanges of the upper arm section. The corresponding locking pin receiving notches are designed to be in registry with the at least one spring-biased locking pin so that it can receive the locking pin in locking relationship. For this the shapes of the locking pin and the receiving notches are also adapted for a locking relationship therebetween; and c) Locking means that is capable of applying pressure to the at least one spring-biased locking pin and holding it in place, thus forcing it into a locking relationship with the corresponding receiving notch when locking of the elbow joint is required. Accordingly the locking means is capable of relieving the pressure on the locking pin so that it can revert back under spring bias to its original position, when unlocking of the elbow joint is required.

According to one aspect of the present invention, as mentioned above, the common hinge member is a carriage bolt with male screw threads at its distal end. The length of the carriage bolt is such that its smooth unthreaded body extends within the centrally-located coplanar screw holes of the swivel head and end flanges of the lower and upper arm sections respectively, whereas its distal end with the male screw thread extend out of the exit end of the relevant end flange. The male screw threads are designed to receive corresponding female screw threads in a female receiving receptacle contained in a locking knob which is the locking means according to this embodiment of the invention. The forward face of the locking knob has an abutting plate which has a flat surface. In this embodiment, the elbow joint is locked simply by twisting the locking knob in one direction so that the locking knob, and therefore its abutting plate, is compelled towards the at least one locking pin via screw action. The abutting plate impinges against the at least one spring-biased locking pin and compels it forward, via its guide channel, towards the corresponding receiving notch for locking the elbow joint. To unlock the joint, the locking knobs is simply twisted on the opposite direction, causing the locking knob and thereby its abutting plate to disengage from the locking pin which will revert to its original position.

According to another aspect of the present invention, in order to prevent the at least one spring-biased locking pin from falling out of its guide channel, the locking knob is designed so that at its maximum extended distance away from the at least one spring-biased locking pin, the gap between its abutting plate and the at least one spring-biased locking pin is less than the length of the locking pin itself. In this way, even if the locking pin were to slide out of its guide channel, it will be prevented from dropping out by the abutting plate of the locking knob.

According to yet another aspect of the present invention, there is provided a guide plate that is fixedly attached to the exposed side of the upper arm's end flange that receives the at least one locking pin. The guide plate has at least one guide hole that corresponds to the at least one spring-biased locking pin. The guide plate naturally has a central hole for the common hinge member to pass through.

According to still yet another aspect of the present invention, the at least one spring-biased locking pin has a mating tip that is thinner than the body of the pin. This is to allow for more locking pin receiving notches and correspondingly more locking positions for the elbow swivel joint of a support arm.

According to one feature of the invention, there are ideally three spring-biased locking pins for locking the elbow swivel joint.

According to still yet another aspect of the present invention, the elbow swivel joint that links the lower and upper arm sections of the support arm has a ratchet-like adjustment mechanism so as to allow the support arm to be swiveled and positioned at various desired elevations. The ratchet-like adjustment mechanism comprises three essential parts as follows:

a) A plurality of ratchet recesses on the engagement surface of the swivel head of the lower arm section of the supporting arm; and
b) At least one ratchet ball bearing that occupies the ratchet recesses. The ratchet recesses are shaped such that a given ratchet ball bearing occupying it can slip out and slide over to the adjacent ratchet recess when there is relative swivel motion between the lower and upper arm sections.
c) At least one ratchet spring, located in a corresponding ratchet spring channel, corresponding to and in registry with the at least one ratchet ball bearing and biased thereagainst. The at least one ratchet spring is held in place and in biased relationship with the at least one ratchet ball bearing by abutment against the fixed guide plate.

In operation of the ratchet-like adjustment mechanism, when a torque is applied to swivel the lower and upper arm sections relative to each other and a predetermined threshold torque magnitude is reached, the at least one ratchet ball bearing pressing against a biasing ratchet spring will move out of the ratchet recess it is occupying and enter into the adjacent ratchet recesses thus allowing the swivel motion in a ratchet-type movement.

According to one feature of the invention, the lower arm and upper arm sections of the support arm have means for length adjustment such as telescoping tubes.

According to one feature of the invention, the upper arm section has traction grooves for ease of gripping especially when the locking mechanism has to be worked.

According to still yet another aspect of the present invention, there is provided an elbow swivel joint that has a locking mechanism.

Also, according to still yet another aspect of the present invention, there is provided a multipurpose support stand, adapted for holding tablet computers, laptop computers, books, etc., that has at least one support arm that has an elbow swivel joint that incorporates and utilizes the locking mechanism of the present invention as described hereinbefore.

According to one feature of the support stand, for stability the stand base has container means holding stabilizing material such as water, sand or any other suitable heavy material.

According to another feature of the support stand, for the ease of the user to operate the locking mechanism, there is provided electric motor means for rotating the locking knob. According to a related feature, naturally the switch or button means for operating the electric motor means is ideally located near the display holder of the support stand, near and in reach of the user.

According to yet another feature of the support stand, the stand base has an extension cord curled up within it for independent electric supply to the stand when needed. The extension cord is expediently spring biased so that it can be retracted automatically after use. According to a related feature, the support stand has appropriate wiring means for channeling electricity to the display holder and appropriate docking means for providing power to an electronic device held by the display holder.

According to still yet another feature of the support stand, the stand has a microphone holder, expediently located near the display holder, for attachment of a microphone. According to a related feature, at least one female socket is provided, likewise expediently located near the display holder, for placement of a removably attachable independent microphone holder.

BRIEF DESCRIPTION OF THE DRAWING FIGURES

For a better understanding of the invention, its operating advantages and the specific objectives attained by its uses, reference should be had to the accompanying drawings and descriptive matter in which there are illustrated preferred embodiments of the invention. The drawings are merely illustrative in nature and should not be construed as limiting the invention in any way.

Figure 1:
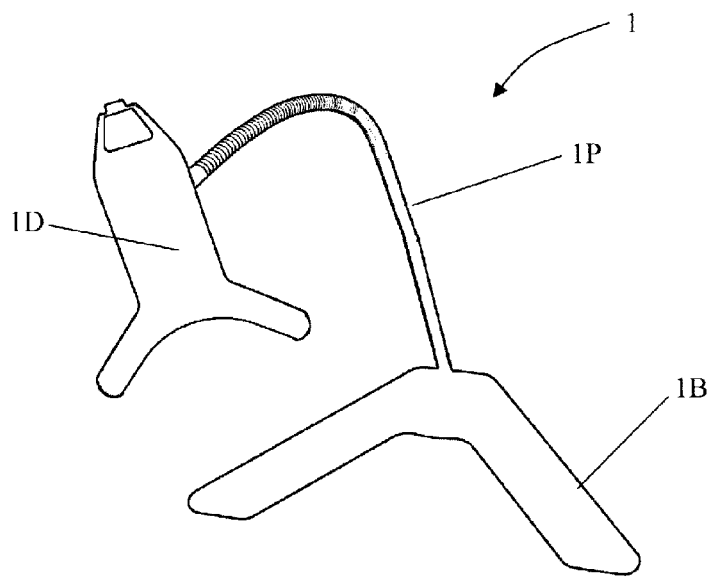
FIG. 1 shows a prior art support stand as sold under the brand name IPROP™.
Figure 2:
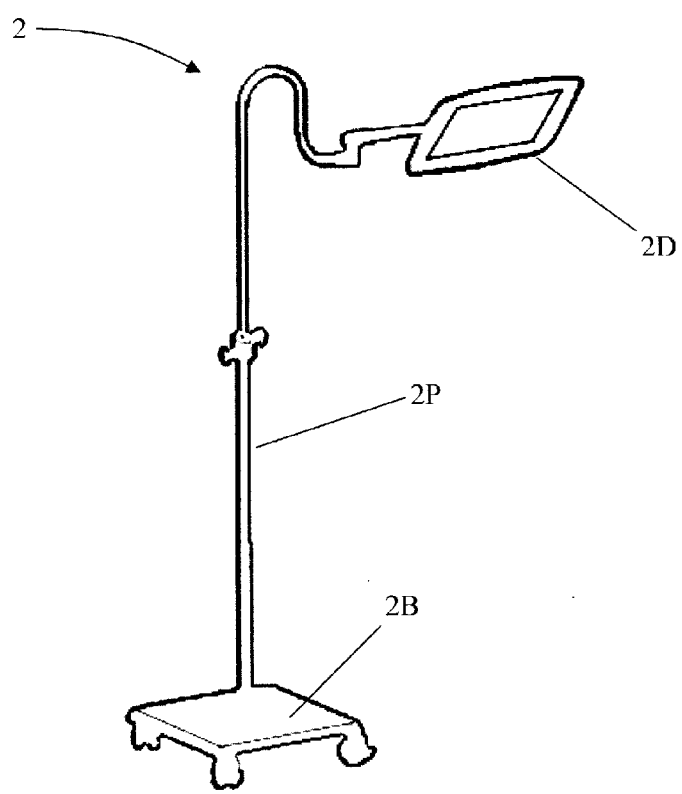
FIG. 2 shows another prior art support stand as sold under the brand name LEVOBOOK™.
Figure 3A:
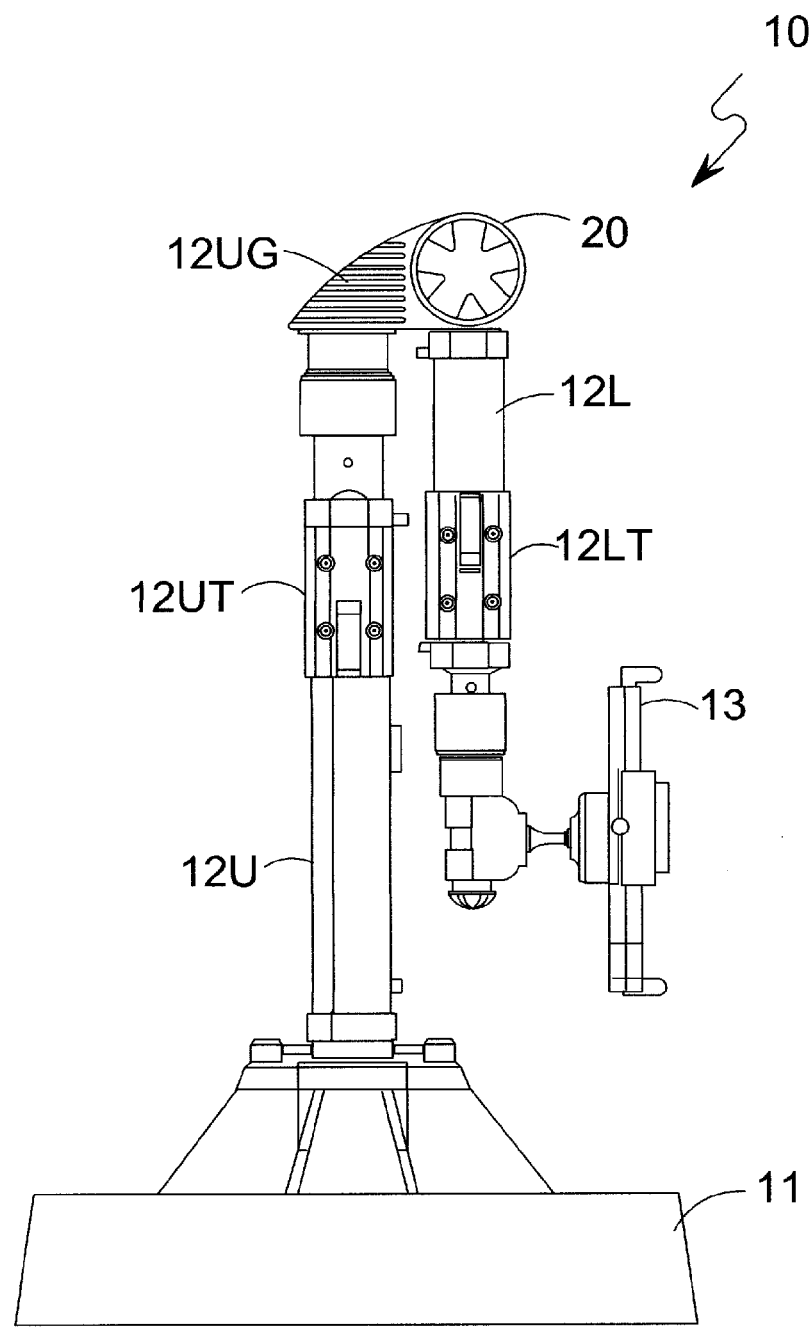
FIGS. 3A to 3D show the support stand that has an elbow swivel joint that utilizes the locking mechanism of the present invention and shows its support arm in various elevations.
Figure 3B:
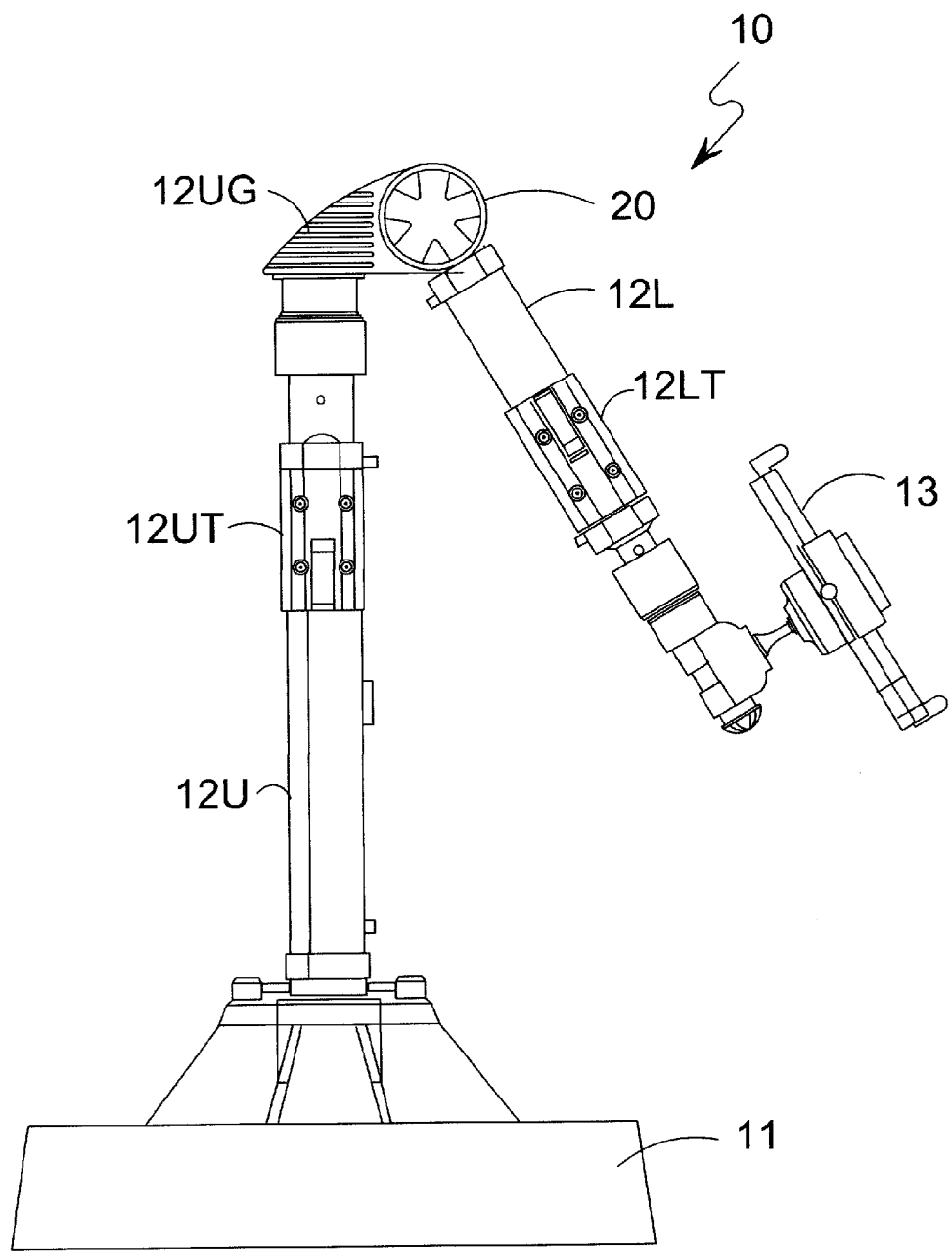
Figure 3C:
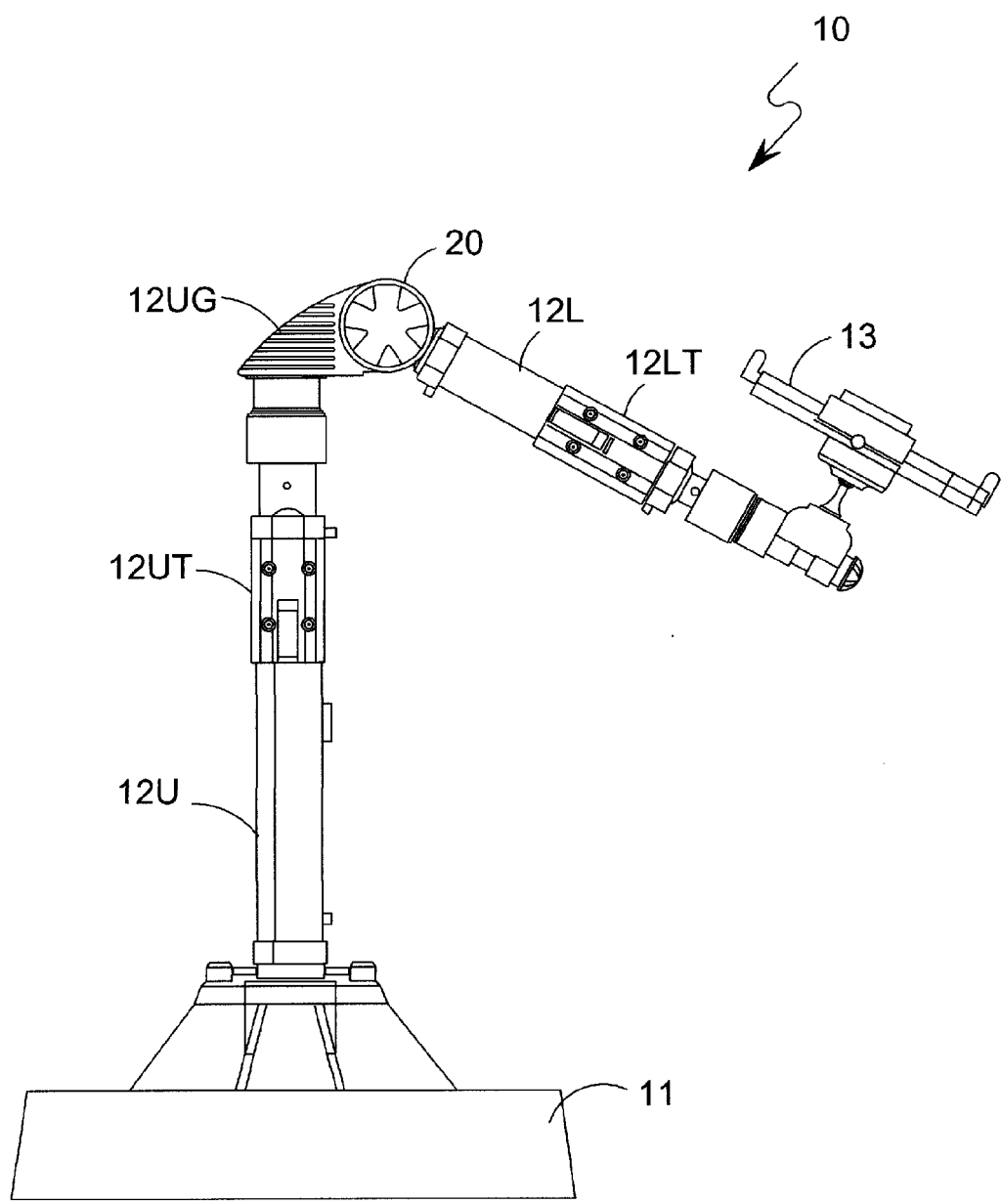
Figure 3D:
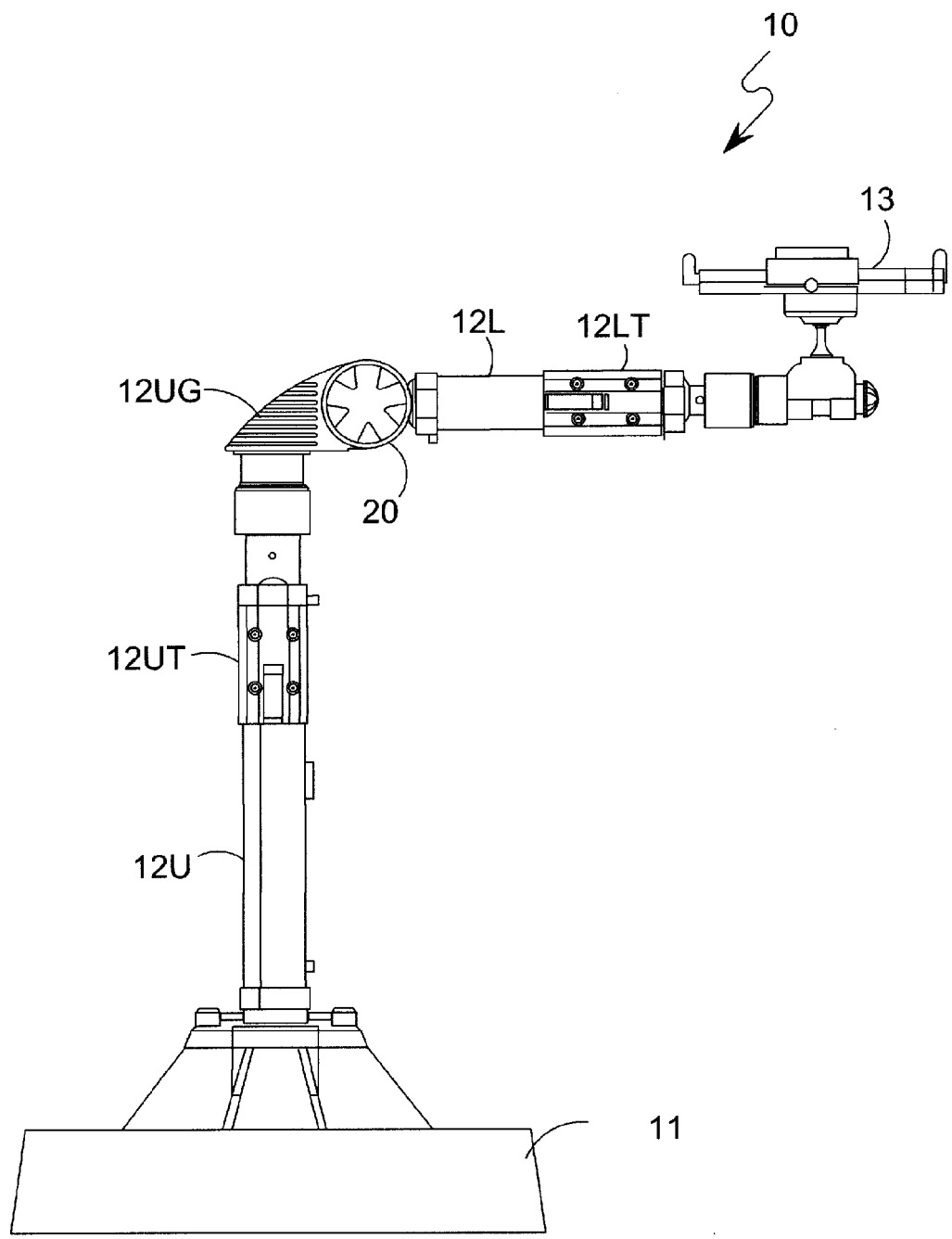
Figure 4A:
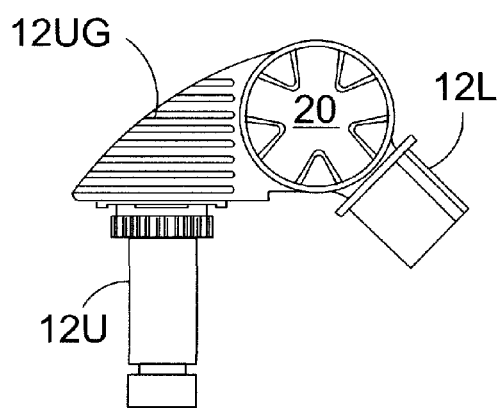
FIGS. 4A to 4D show the elbow swivel joint in isolation and in various locked positions using the locking mechanism of the present invention.
Figure 4B:
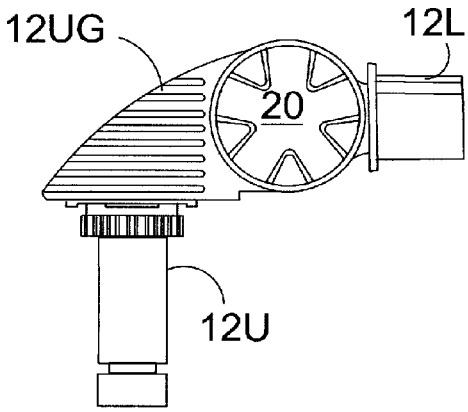
Figure 4C:
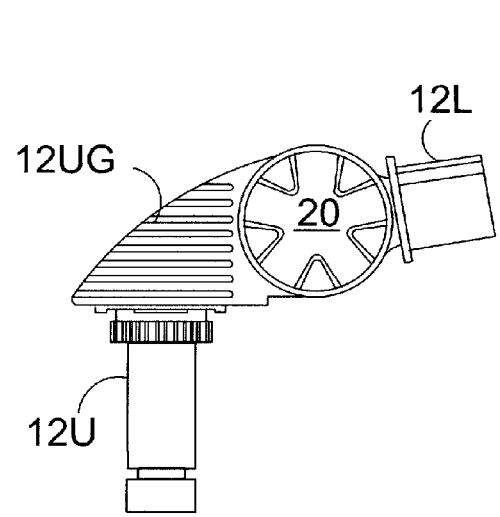
Figure 4D:
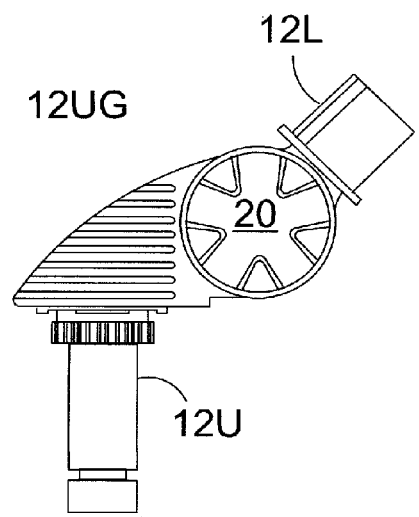
Figure 5:
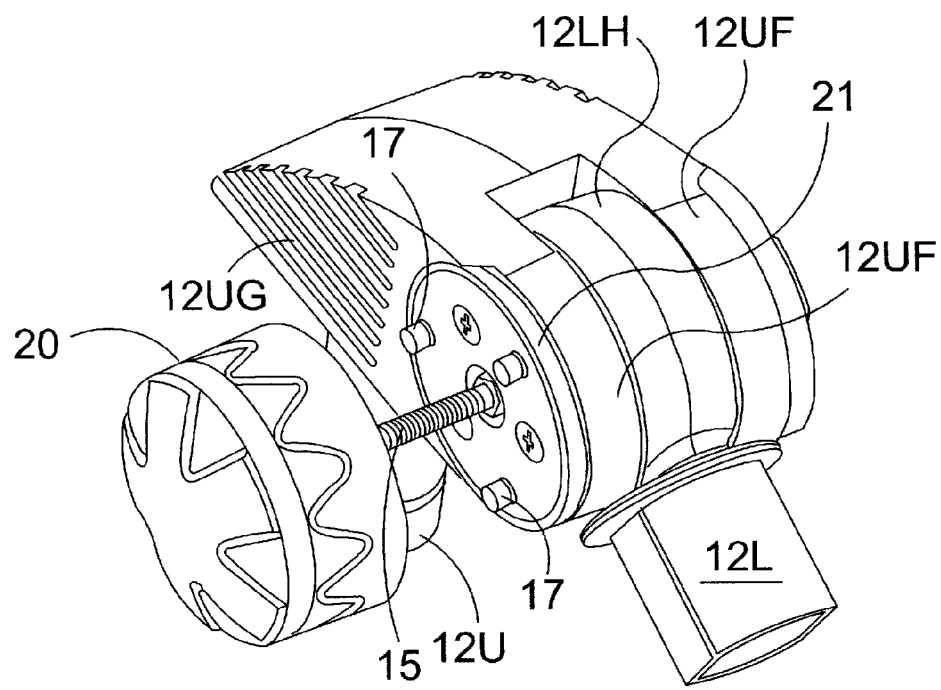
FIG. 5 is a top perspective view of the elbow swivel joint with the locking mechanism in unlocked status.
Figure 6:
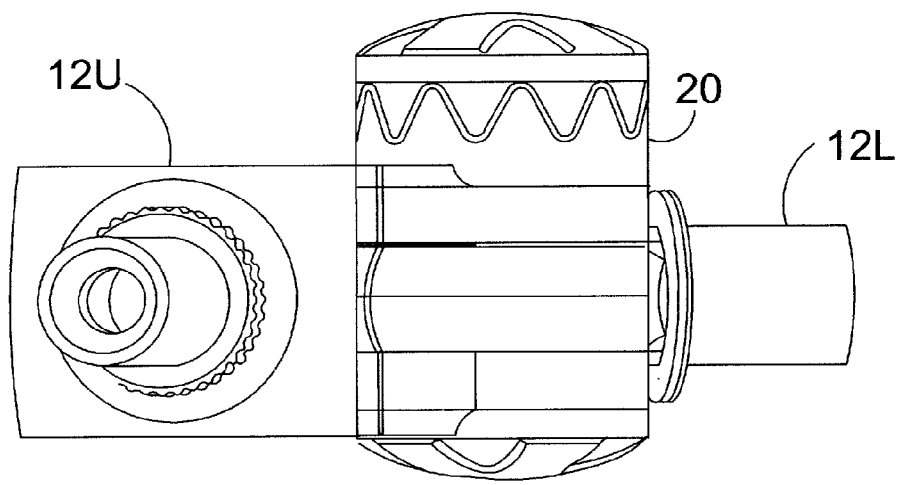
FIG. 6 is a bottom plan view of the elbow swivel joint with the locking mechanism in locked status.
Figure 7:
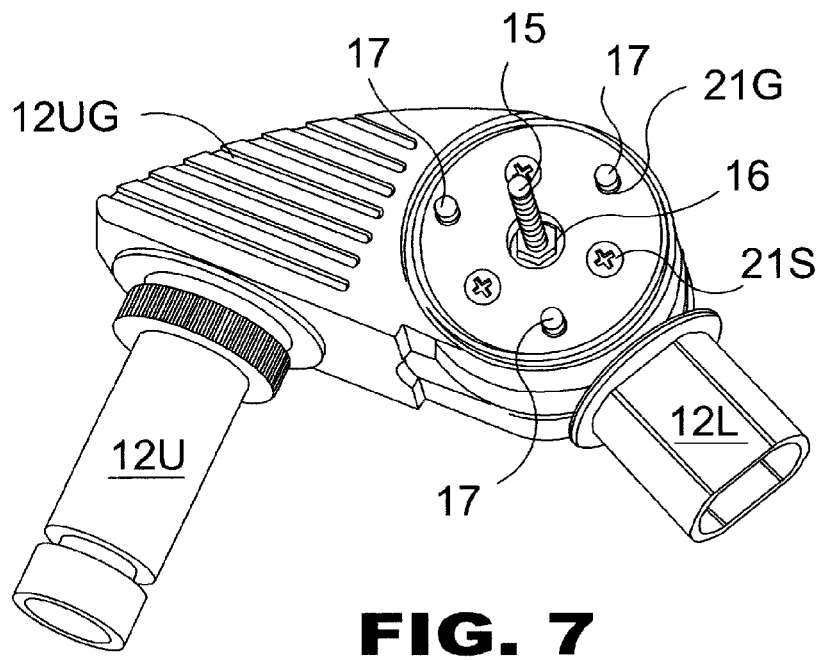
FIG. 7 is a perspective view of the elbow swivel joint with the locking knob removed.
Figure 8:
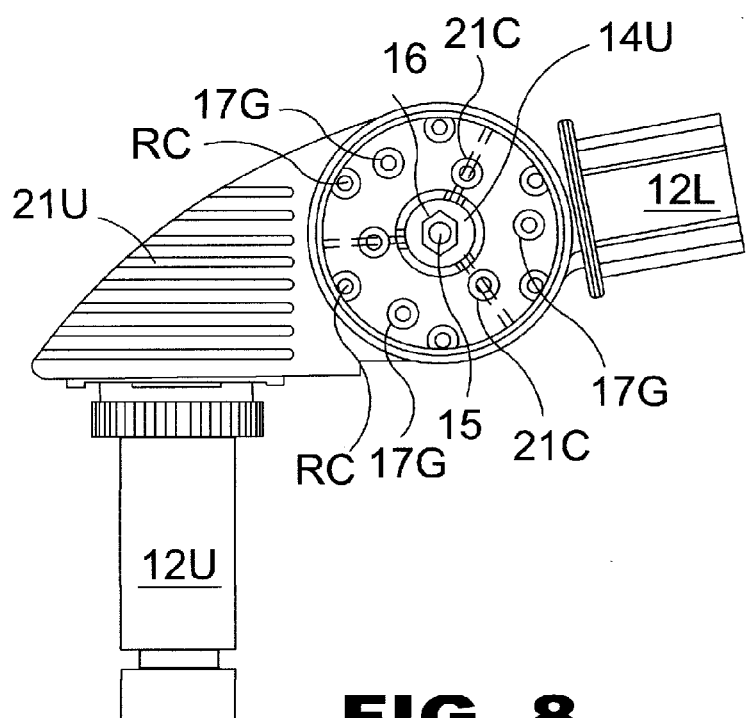
FIG. 8 is a side view of the elbow swivel joint with the locking knob and guide plate removed to illustrate the internals of the end flange of the upper arm section of the support arm of the support stand.
Figure 9:
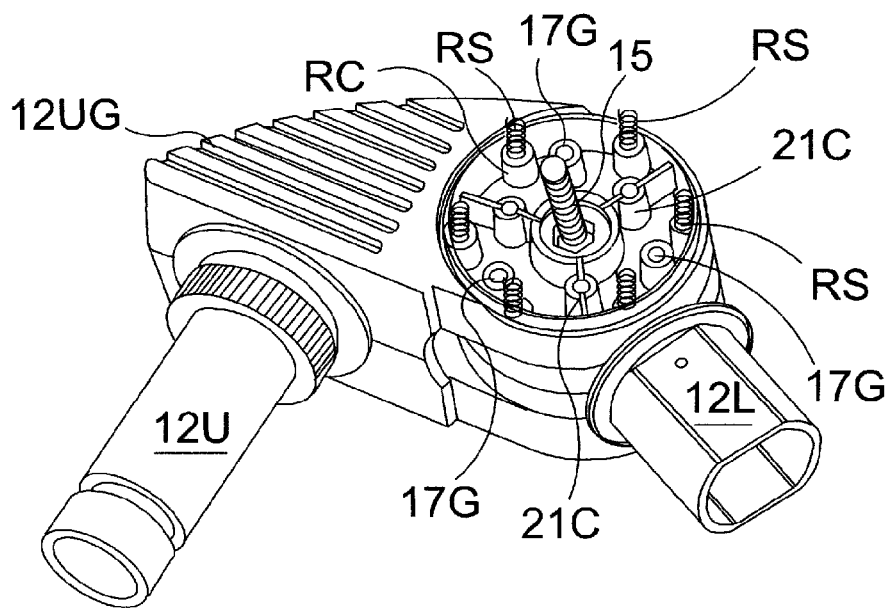
FIG. 9 is a perspective view of the elbow swivel joint with the locking knob and guide plate removed and showing the six ratchet springs in their respective ratchet recesses.

In describing the preferred embodiments of the invention, specific terminology will be resorted to for the sake of clarity. However, it is not intended that the invention be limited to the specific terms so selected and it is to be understood that each specific term includes all technical equivalents that operate in a similar manner to accomplish a similar purpose. Combination of the various embodiments of the present invention as described herein may also be used depending on specific facility requirements.

DETAILED DESCRIPTION OF THE DRAWING FIGURES AND DESCRIPTION OF THE PREFERRED EMBODIMENTS

Various aspects of the present invention will evolve from the following detailed description of the preferred embodiments thereof, which should be taken in conjunction with the heretofore described drawings.

To place the present invention in perspective, FIGS. 3A to 3D depict a support stand, generally designated by reference numeral 10, with its support arm in various elevations. The support stand 10 generally comprises a stand base 11 connected to a pivotable support arm that comprises an upper arm section 12U and a lower arm section 12L. The lower arm section 12L is connected to a display holder 13 that is adapted to securely hold a variety of suitable objects such as tablet computers, laptop computers, ebooks, books, presentation material, etc. The display holder 13 is connected to the lower arm section 12L by a suitable joint, such as a ball and socket joint, to allow it to be placed in various positions. The upper arm 12U and lower arm 12L sections also have adaptations to allow them to be twisted along their respective longitudinal axes. The upper arm 12U and lower arm 12L sections further have length adjustment adaptations 12UT and 12LT, such as telescoping tube designs, to allow them to be extended or retracted longitudinally and locked in place. This provides for height adjustment of the upper arm section 12U and length adjustment of the lower arm section 12L. To pivotally adjust the height of the lower arm section 12L in the vertical plane relative to the upper arm section 12U, the two sections are connected by an elbow swivel joint (FIGS. 4A to 4D) that allows such height adjustment in the vertical plane. The elbow swivel joint is designed with a ratchet-like adjustment mechanism that will be described later.

Figure 10:
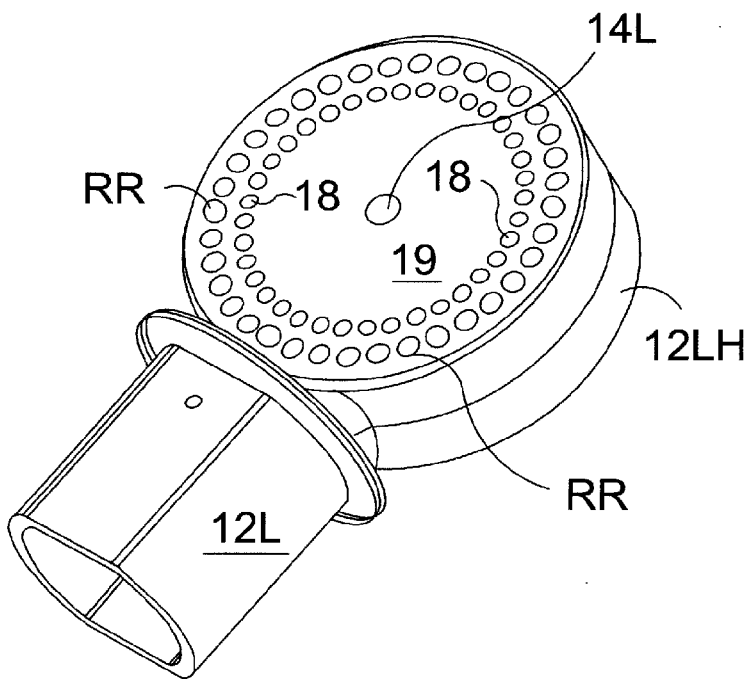
FIG. 10 shows the swivel head of the lower arm section of the support arm of the support stand.
Figure 11:
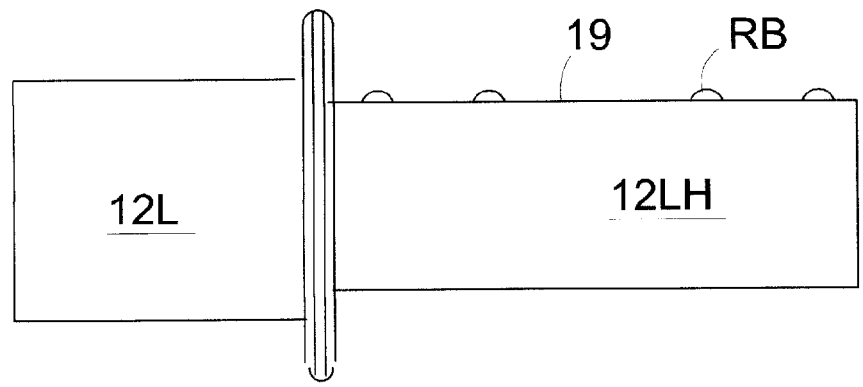
FIG. 11 is a side view of the swivel head to illustrate the ratchet ball bearings.
Figure 12:
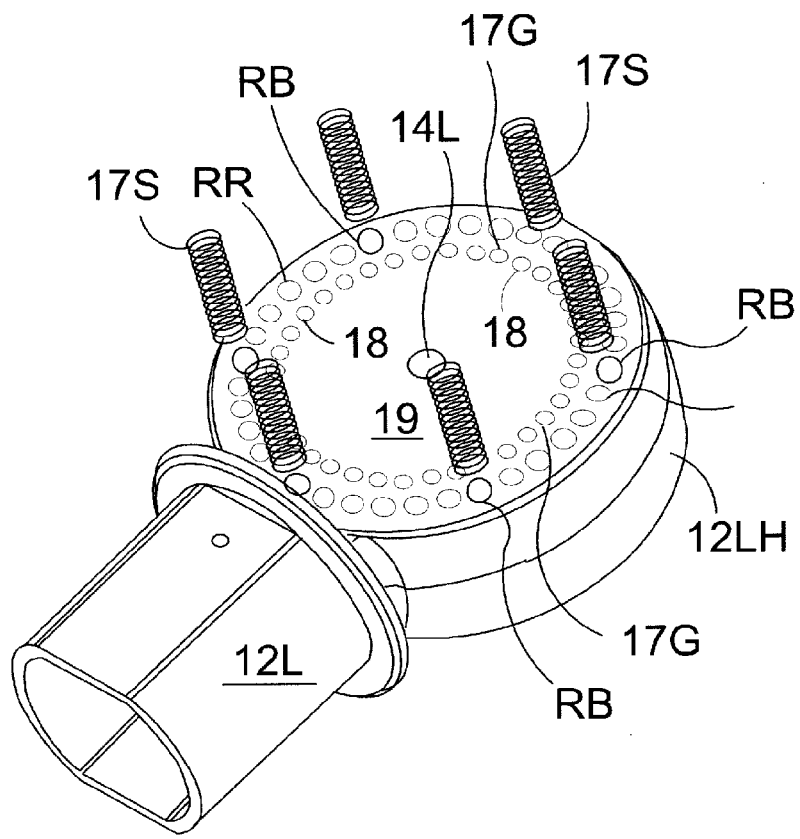
FIG. 12 is a perspective view of the swivel head that shows the ratchet ball bearings and the positions of their corresponding ratchet springs.
Figure 13:
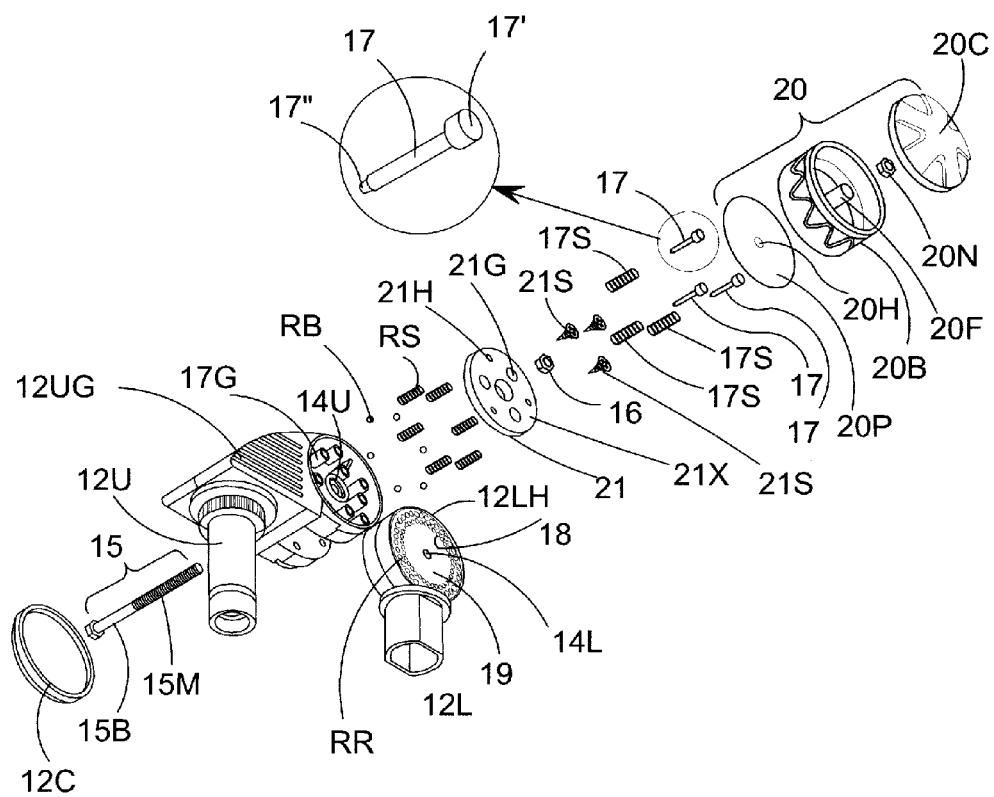
FIG. 13 is a perspective view of the elbow swivel joint that utilizes the locking mechanism of the present invention blown up to illustrate the component parts thereof.

The elbow swivel joint itself is made up of the end portions of the lower arm 12L and upper arm 12U sections of the support arm. To make the swivel joint, the lower arm section 12L has a round and flat swivel head 12LH (FIGS. 10 and 13) and the upper arm section 12U has a pair of corresponding end flanges 12UF (FIG. 13), the distance between which is designed to snugly receive the swivel head 12LH of the lower arm section 12L. The swivel head 12LH has a centrally-located screw hole 14L and the corresponding end flanges 12UF likewise have centrally-located screw holes 14U that are coplanar with that of the swivel head 12LH. The elbow swivel joint is completed with a hinge screw in the form of a carriage bolt 15 that runs through the coplanar screw holes. The carriage bolt 15 is secured with a securing nut 16. In this way a swivel joint in the form of a live hinge is formed that allows relative pivoting movement between the lower arm section 12L and upper arm section 12U of the support arm. Referring to FIG. 13, the carriage bolt 15, i.e. the part about which the swivel head 12LH and end flanges 12UF pivot, has a proximal body section 15B that is smooth for the pivoting action and a distal end that has male screw threads 15M. The male screw threads 15M extend out of the exit end of the end flange 12UF of the upper arm section 12U. For aesthetics, and end cap 12C hides the head of the carriage bolt 15 and completes the elbow swivel joint.

This ratchet-like adjustment mechanism mentioned earlier of the elbow swivel joint allows step-wise adjustment of the lower arm section 12L of the support arm and is designed so that the lower arm section 12L and a given load on its display holder 13, such as a tablet computers, laptop computers, ebooks and the like, can be freely supported, up to a certain weight, without the lower arm section 12L dropping down.

The elbow swivel joint, while having a ratchet-like adjustment mechanism, needs to be capable of being locked firmly so that the support arm, once moved to the desired position, can be securely locked in place. For this, the elbow swivel joint is equipped with the locking mechanism of the present invention. Referring to FIGS. 5 to 13 and in particular FIG. 13, the locking mechanism of the present invention for the elbow swivel joint essentially comprises three spring biased locking pins 17 that sit in three open-ended guide channels 17G in the relevant end flange 12UF, a plurality of corresponding locking pin receiving notches 18 on the engagement surface 19 of the swivel head 12LH, and a locking knob 20 for compelling the three spring biased locking pins 17 into mating engagement with the corresponding locking pin receiving notches 18. The upper arm section 12U of the support arm expediently has traction grooves 12UG for easy gripping by the user especially when working the locking knob 20.

Each of the three spring biased locking pins 17 in its open-ended guide channel 17G has its biasing spring 17S likewise housed in the open-ended guide channels 17G. Each locking pin 17 also has a length greater than the depth of the open-ended guide channel 17G it is housed in so that its pin-head portion 17' (see locking pin magnification in FIG. 13) juts out of the open-ended guide channel 17G as shown in the drawings but its mating tip 17" does not extend out of the other end of the open-ended guide channel 17G when the locking pins 17 is not depressed for locking. One end of each of the open-ended guide channels 17G has a thin inwardly extending annular shoulder (not shown) against which one end of the biasing spring 17S abuts. The other end of the biasing spring 17S abuts the pin-head portion 17' of the locking pin 17. According to a preferred embodiment of the invention, the mating tip 17" of each of the locking pins 17 has a smaller cylindrical circumference than the body of the pin. By making the mating tip 17" thinner, more locking pin receiving notches 18 can be made in the flat swivel head 12LH since each receiving notch 18 will have a likewise smaller internal cylindrical circumference. This in turn allows for more locking positions for the support arm.

Referring in particular to FIG. 13, the locking knob 20 is comprised of a tubular body portion 20B, an abutting plate 20P of flat surface with a central hole 20H for entry of the carriage bolt 15, and a cover piece 20C. The body portion 20B has a centrally-located female receiving receptacle 20F that is in registry with the central hole 20H of the abutting plate 20P and has female screw threads. The female screw threads of this female receiving receptacle 20F are designed to matingly engage the male screw threads 15M of the carriage bolt 15. Twisting the locking knob 20 clockwise causes it to move toward the elbow swivel joint. Turning it counter clockwise moves it away from the elbow swivel joint. A stopper nut 20N or other suitable means prevents the locking knob 20 from disengaging from the carriage bolt 15 and dropping off. Further, to prevent the three locking pins 17, that freely sit in the open-ended guide channels 17G, from falling out when the locking knob 20 is at its maximum extension, the length of the male threads 15M of the carriage bolt 15 is made less than the length of the locking pins 17. In other words, the maximum distance between the pin-head portion 17' of each locking pin 17 and the abutting plate 20P of the locking knob 20 is less than the length of each locking pin 17, so that at that maximum distance any locking pin that slips out of its open-ended guide channel 17G will simply be prevented from falling out of its perch by the abutting plate 20P of the locking knob 20.

Additionally, a guide plate 21 is attached to the side of the face of the end flange 12UF, that contains the open-ended guide channels 17G, by means of fixing screws 21S that engage corresponding fixing screw receptor channels 21C in the end flange 12UF via suitable screw holes 21H in the guide plate 21. The guide plate 21 also has a centrally-located hole 21X that, when the guide plate 21 is screwed in, is coplanar with the central holes 14L and 14U respectively of the swivel head 12LH and end flange 12UF. This centrally-located hole 21X is adapted for the carriage bolt 15 to pass through. The guide plate 21 further has three guide holes 21G that correspond to the open-ended guide channels 17G of the end flange 12UF. The guide holes 21G are designed to receive the three locking pins 17 and guide them into their respective open-ended guide channels 17G. The guide plate 21 plays an important role in the conventional ratchet-like adjustment mechanism of the elbow swivel joint that will be described later.

To operate the locking mechanism to lock the elbow swivel joint in order to fix the support arm is a desired position, the locking knob 20 is turned in a clockwise direction. This causes it to move forward, driven by the engagement of its female receiving receptacle 20F with the male screw threads 15M of the carriage bolt 15. The abutting plate 20P of the locking knob 20 will then press against the exposed pin-head portions 17' of the three locking pins. The locking pins 17 will be forced forward under spring tension of their respective biasing springs 17S and each of their mating tip 17" will penetrate a corresponding locking pin receiving notch 18 on the engagement surface 19 of the swivel head 12LH of the lower arm section 12L. The locking knob 20 is then twisted to the maximum to lock the locking pins 17 in place. In this configuration, the three locking pins 17 are fully engaged with their corresponding locking pin receiving notches 18, and the elbow swivel joint is fully secured. To unlock the elbow swivel joint, the locking knob 20 is simply turned in the anticlockwise direction. This causes it to move backward and its abutting plate 20P will gradually move away from the three locking pins 17. As this happens, the three locking pins 17 will disengage from their respective locking pin receiving notches 18, by the expansion of their respective hitherto compressed biasing springs 17S, and return to their original positions in their respective open-ended guide channels 17G. This action will unlock the elbow swivel joint.

While according to this preferred embodiment of the invention only one locking mechanism on one side of the elbow swivel joint is described, it is fully within the scope of this invention that a second such locking mechanism is present on the other side of the elbow swivel joint. In this way, the locking and unlocking of the support arm can be actuated from either side of the support stand 10.

Also, while according to this preferred embodiment of the invention three spring biased locking pins 17 are employed for the locking action, more than three or less than three locking pins 17 may be used as well. More locking pins will naturally result in more secure locking, but obviously there are design limitations to the number. It has been found that three locking pins 17 are ideal for the task.

It is also within the scope of this invention that there is provided a mechanical or electric motor means for working the locking knob 20 without the user having to physically reach out to the locking knob 20 and twist it directly. It is expedient that the lever or switch or button, as the case may be, for actuating this mechanical or electric motor means be located near or on the display holder 13 so that a user proximate the display holder 13 can work the locking mechanism remotely.

Figure 14:
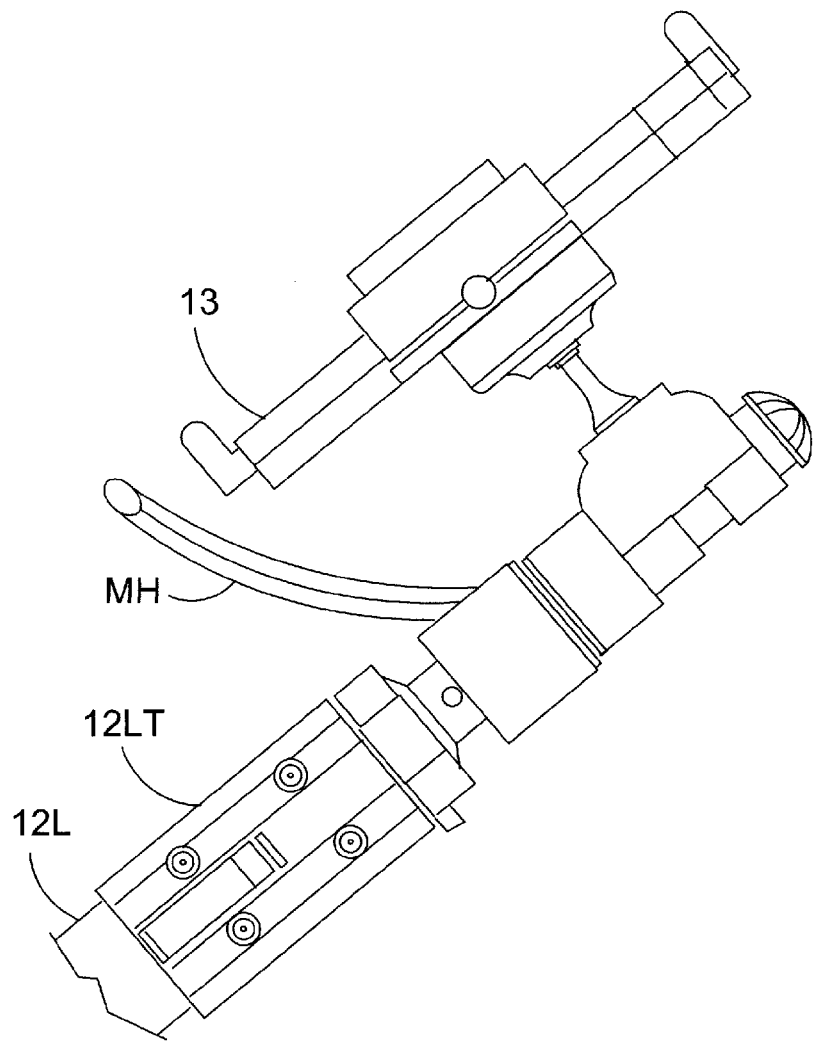
FIG. 14 is a side view that illustrates the microphone holder at the display holder end of the lower arm section of the support arm.

Referring to FIG. 14, it is also within the scope of this invention that there is provided a microphone holder MH proximate the display holder 13. Instead of a microphone holder, according to another embodiment, one or more female sockets may be provided near the display holder for fixing of a mobile microphone holder.

As mentioned before, and according to a preferred embodiment of the present invention, the elbow swivel joint that links the lower and upper arm sections of the support arm has a ratchet-like adjustment mechanism in order to permit the support arm to be swiveled and positioned at various desired elevations prior to locking it in position using the locking mechanism of the present invention.

Referring particularly to FIG. 13, the ratchet-like adjustment mechanism comprises three essential parts, namely a plurality of ratchet recesses RR on the engagement surface 19 of the swivel head 12LH of the lower arm section 12L of the supporting arm, six ratchet ball bearings RB occupying the ratchet recesses RR and equidistant from one another, and six corresponding ratchet springs RS. The shape of each ratchet recess RR is designed such that a given ratchet ball bearing RB occupying it can slip out and slide over to the adjacent ratchet recess RR when there is relative swivel movement between the lower arm 12L and upper arm 12U sections of the support arm. Each of the six ratchet springs RS is housed in a ratchet spring channel RC in the end flange 12UF of the upper arm section 12U and corresponds to and is in registry with each of the six ratchet ball bearings RB. Each of the six ratchet springs RR are held in place in their respective channels RC, compressed and abutting its corresponding ratchet ball bearing RB, by the fixed guide plate 21. Therefore, each of the six ratchet springs RR is spring biased and forced towards the given ratchet recess RR it is occupying.

In operation of the ratchet-like adjustment mechanism, when a torque is applied to swivel the lower arm 12L and upper arm 12U sections of the support arm relative to each other, as when the lower arm 12L is attempted to be swiveled to a desired position, the tension in the six ratchet springs RS pressing against the six ratchet ball bearings RB will initially resist any movement. However, once a predetermined threshold torque magnitude is reached, the six ratchet ball bearings RB will slip out of the ratchet recesses RR that they are occupying and enter into the adjacent ratchet recesses. In this way, lower arm 12L and upper arm 12U sections are permitted to swivel in a ratchet-type movement. It is to be noted too that this ratchet-like adjustment mechanism allows the lower arm 12L and upper arm 12U sections to swing in both directions.

According to one preferred embodiment of the present invention, the support stand 10 utilizes the locking mechanism described hereinbefore for locking its elbow swivel joint and has a stand base 11 that can be filled with stabilizing material such as water or sand, and means for draining the stabilizing material. Suitably, a container is disposed within the stand base 11 for receiving the stabilizing material. One of the advantages of having such a stand base 11, that can be filled with stabilizing material, is that when the support stand 10 has to be shifted or transported its weight can be reduced by removing the stabilizing material.

Those skilled in the art will appreciate that various modifications may be made to the present invention without departing from the underlying inventive concept inherent in it. The embodiments of the invention described herein are only meant to facilitate understanding of the invention and should not be construed as limiting the invention to those embodiments only. Those skilled in the art will appreciate that the embodiments of the invention described herein are susceptible to variations and modifications other than those specifically described. It is to be understood that the invention includes all such variations and modifications that fall within the scope of the underlying inventive concept of the present invention.

INDUSTRIAL APPLICABILITY

The locking mechanism of the present invention finds ready industrial applicability, in particular for use in the elbow swivel joints of support stands. This locking mechanism is perfect for heavy duty use as it is robust and can keep the joint locked even when the stand is burdened with heavy loads. The support stand that utilizes the locking mechanism of this invention, due to the strength of the locking, may even be used in place of a conventional rostrum for stages and the like. The support stand used in this way will have a clear advantage and user friendliness compared to a rostrum, since a rostrum is a fixed structure whereas the support stand can be adjustable in height and angle of viewing of its display holder.

What is claimed is:

1. A locking mechanism for an elbow swivel joint of a support arm for selectively locking a lower arm section and an upper arm section of said support arm relative to each other, said lower arm section having a swivel head disposed between corresponding end flanges of said upper arm section, said swivel head and said corresponding end flanges hinged about a common hinge member threaded through centrally-located coplanar screw holes respectively in said swivel head and said corresponding end flanges, said locking mechanism comprising:
   at least one spring-biased locking pin disposed in at least one corresponding open-ended guide channel in said at least one corresponding end flanges of said upper arm section;
   a plurality of corresponding locking pin receiving notches on the engagement surface of said swivel head of said lower arm section abutting said end flanges of said upper arm section and in registry with said at least one spring-biased locking pin, said corresponding locking pin receiving notches adapted to receive said at least one spring-biased locking pin in mating relationship; and,
   locking means for releasably forcing said at least one spring-biased locking pin into locking relationship with said plurality of corresponding locking pin receiving notches, wherein a guide plate with a central hole for said common hinge member is fixedly attached to an exposed side of said end flanges of said upper arm section, said guide plate having at least one corresponding guide hole for receiving said at least one spring-biased locking pin,
   said elbow swivel joint having a ratchet adjustment mechanism, comprising:
   a plurality of ratchet recesses on said engagement surface of said swivel head of said lower arm section;
   at least one ratchet ball bearing occupying said ratchet recesses, said ratchet recesses being made so that said at least one ratchet ball bearing is able to shift to an adjacent ratchet recess when said lower arm section and said upper arm section of said support arm pivotally move relative to each other; and,
   at least one ratchet spring corresponding to said at least one ratchet ball bearing and biased there against, said at least one ratchet spring located in a corresponding ratchet spring channel and held in place and in a biased relationship with said at least one ratchet ball bearing by abutment against said fixed guide plate,
   wherein, in operation, a torque exceeding a predetermined threshold magnitude causes said at least one ratchet ball bearing pressing against a corresponding biasing ratchet spring to move out of the ratchet recess it is occupying and enter into the adjacent ratchet recess and, thereby causing said lower arm section to pivot in a step-wise ratchet movement relative to the upper arm section of said support arm in a ratchet movement.

2. The locking mechanism according to claim 1, wherein said common hinge member is a carriage bolt with male screw threads at its distal end which extends out of an exit end of said end flanges of said upper arm section, and said locking means is a locking knob that has an abutting plate and corresponding female screw threads in a female receiving receptacle for mating engagement with said male screw threads, whereby twisting of said locking knob in one direction causes said abutting plate of said locking knob to impinge against said at least one spring-biased locking pin for locking said elbow swivel joint and twisting said locking knob in the opposite direction releases said at least one spring-biased locking pin for unlocking said elbow swivel joint.

3. The locking mechanism according to claim 2, wherein said locking knob is designed so that a maximum extendible distance between said abutting plate and said at least one spring-biased locking pin is less than a length of said at least one spring-biased locking pin in order to prevent said at least one spring-biased locking pin from falling out of its said at least one corresponding open-ended guide channel when said locking knob is fully extended.

4. The locking mechanism according to claim 1, wherein said at least one spring-biased locking pin has a mating tip of smaller circumference relative to said locking pin so as to allow for more corresponding locking pin receiving notches and therefore more locking positions for said locking mechanism and therefore said supporting arm.

5. The locking mechanism according to claim 4, wherein there are three spring-biased locking pins for the locking action.

6. The locking mechanism according to claim 1, wherein said lower arm section and upper arm section of said support arm have length adjustment means.

7. The locking mechanism according to claim 1, wherein said upper arm section has traction grooves.

\* \* \* \* \*